United States Patent
Kim et al.

(10) Patent No.: US 8,493,648 B2
(45) Date of Patent: Jul. 23, 2013

(54) METHOD OF FABRICATING ELECTROPHORETIC INK, ELECTROPHORETIC INK FORMED USING THE METHOD, AND ELECTROPHORETIC DISPLAY HAVING THE SAME

(75) Inventors: Chul Am Kim, Seoul (KR); Hyeonjung Yoo, Busan-si (KR); Kyung Soo Suh, Daejeon (KR); Seung Youl Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 12/765,425

(22) Filed: Apr. 22, 2010

(65) Prior Publication Data
US 2011/0122480 A1    May 26, 2011

(30) Foreign Application Priority Data
Nov. 20, 2009    (KR) .................. 10-2009-0112664

(51) Int. Cl.
*G02B 26/00*    (2006.01)
*G09G 3/34*    (2006.01)
*A61J 3/07*    (2006.01)
*B01J 13/02*    (2006.01)

(52) U.S. Cl.
USPC ........ 359/296; 345/107; 430/32; 430/137.12; 430/137.15; 430/138; 347/100; 264/4; 264/4.33; 264/4.7

(58) Field of Classification Search
USPC ............... 359/296; 345/107; 430/32, 137.12, 430/137.15, 138; 347/100; 264/4, 4.33, 4.7
See application file for complete search history.

(56) References Cited

U.S. PATENT DOCUMENTS

| | | | |
|---|---|---|---|
| 4,420,586 A | 12/1983 | Bhattacharyya et al. | |
| 7,280,266 B1 | 10/2007 | Chopra et al. | |
| 7,382,514 B2 | 6/2008 | Hsu et al. | |
| 2009/0206499 A1* | 8/2009 | Whitesides et al. | 264/4.1 |

FOREIGN PATENT DOCUMENTS

| | | |
|---|---|---|
| KR | 10-0619014 A | 8/2006 |
| KR | 10-0644614 A | 11/2006 |
| KR | 10-20070071037 A | 7/2007 |

OTHER PUBLICATIONS

K. Tauer et al.; Study on the Preparation and Stabilization of Pyrene Labeled Polymer Particles in Nonpolar Media; Polymer Reaction Eng., vol. 11(3), p. 305-318 (2003).

* cited by examiner

*Primary Examiner* — Evelyn A. Lester
(74) *Attorney, Agent, or Firm* — Rabin & Berdo, P.C.

(57) ABSTRACT

Provided are a method of fabricating an electrophoretic ink, the electrophoretic ink formed using the method, and an electrophoretic display having the same. The method of fabricating an electrophoretic ink includes dispersing pigment particles into a dielectric fluid; adding at least one monomer and an initiator into the dielectric fluid; and forming polymeric membranes surrounding the pigment particles in the dielectric fluid. Since the pigment particle surrounded by the polymeric membrane and the dielectric fluid in which the pigment particle is dispersed can be utilized as the electrophoretic ink as they are without a follow-up cleaning process, the method of fabricating the electrophoretic ink is simplified.

15 Claims, 5 Drawing Sheets

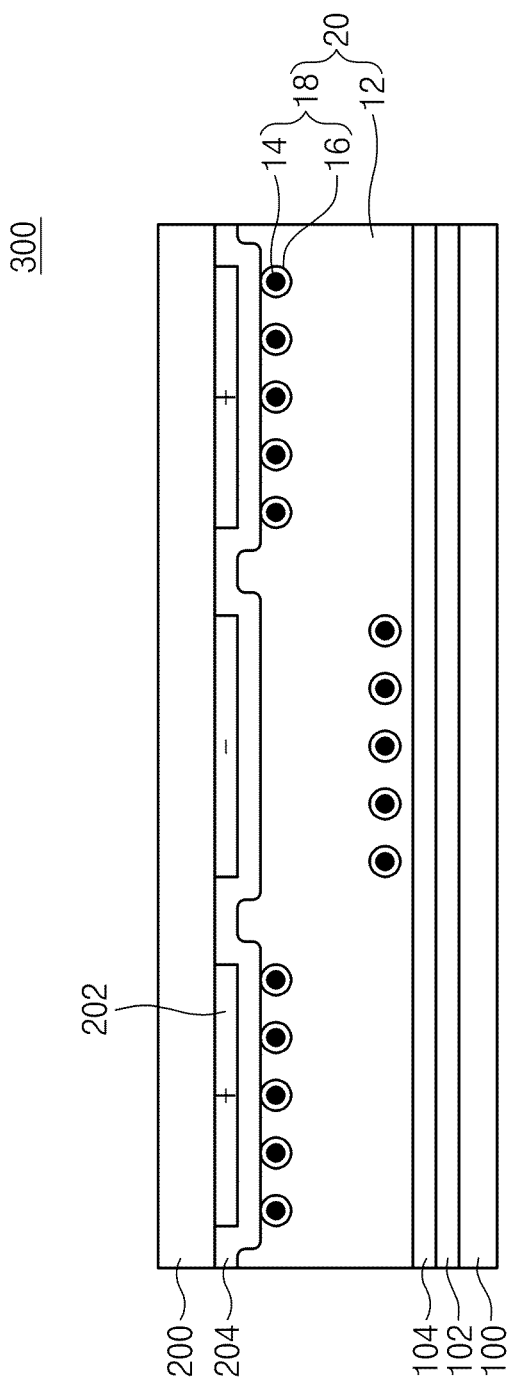

METHOD OF FABRICATING ELECTROPHORETIC INK, ELECTROPHORETIC INK FORMED USING THE METHOD, AND ELECTROPHORETIC DISPLAY HAVING THE SAME

CROSS-REFERENCE TO RELATED APPLICATIONS

This U.S. non-provisional patent application claims priority under 35 U.S.C. §119 of Korean Patent Application No. 10-2009-0112664, filed on Nov. 20, 2009, the entire contents of which are hereby incorporated by reference.

BACKGROUND OF THE INVENTION

The present invention disclosed herein relates to a method of fabricating an electrophoretic ink, the electrophoretic ink formed using the method, and an electrophoretic display having the same.

An electronic paper is a display medium having the best properties of paper. In particular, electronic paper is being regarded as the next-generation reflective display medium that offers visibility and flexibility similar to those of paper media, as well as low power consumption for a long active operating time. Generally, the electronic paper can minimize power consumption due to its bistability that can maintain an original image for a long period of time even through a voltage is not applied. Among electronic paper technologies having such properties, an electrophoretic display has been researched for the longest time since 1970's. Although new electrophoretic displays have been developed since 1970's, limitations with respect to the particle stability were not overcome until 1997. To overcome such limitations, microcapsule-type electrophoretic displays have been introduced. As a result, an electrophoretic display-type electronic paper technology made the next leap forward. An electrophoretic ink manufactured using a microcapsule-type electrophoretic method is leading the development of electronic paper for which commercial potential is sufficiently confirmed, as well as for the application of grayscale displays, such as electronic books that have been commercialized at present and electronic newspapers in which commercialization is in progress. However, such a microcapsule-type electrophoretic ink has need for a microcapsulation process. Thus, its manufacturing process is complicated.

SUMMARY OF THE INVENTION

The present invention provides a method of fabricating an electrophoretic ink, the electrophoretic ink formed using the method, and an electrophoretic display having the same.

Embodiments of the present invention provide methods of fabricating an electrophoretic ink include: dispersing pigment particles into a dielectric fluid for the electrophoretic ink; and adding at least monomers and initiator to the dielectric fluid to form polymeric membranes surrounding the pigment particles.

In some embodiments, the pigment particles surrounded by the polymeric membranes and the dielectric fluid in which the pigment particles are dispersed may be directly used as the electrophoretic ink.

In other embodiments, the methods may further include adding at least one of a charge control agent and a stabilizer into the dielectric fluid.

In other embodiments of the present invention, electrophoretic inks include: electrophoretic particles including pigment particles and polymeric membranes surrounding the pigment particles; and a dielectric fluid in which the electrophoretic particles are dispersed.

In still other embodiments of the present invention, electrophoretic displays include: a first substrate; a second substrate facing the first substrate; a common transparent electrode disposed on a surface of the first substrate facing the second substrate; a plurality of pixel electrodes arranged on a surface of the second substrate facing the first substrate, the plurality of pixel electrode being separated from each other; and an electrophoretic ink disposed between the common transparent electrode and the pixel electrodes, wherein the electrophoretic ink includes an electrophoretic particle including a pigment particle and a polymeric membrane surrounding the pigment particle and a dielectric fluid in which the electrophoretic particle is dispersed.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2 is a sectional view of an electrophoretic display according to an embodiment of the present invention;

DETAILED DESCRIPTION OF PREFERRED EMBODIMENTS

Preferred embodiments of the present invention will be described below in more detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
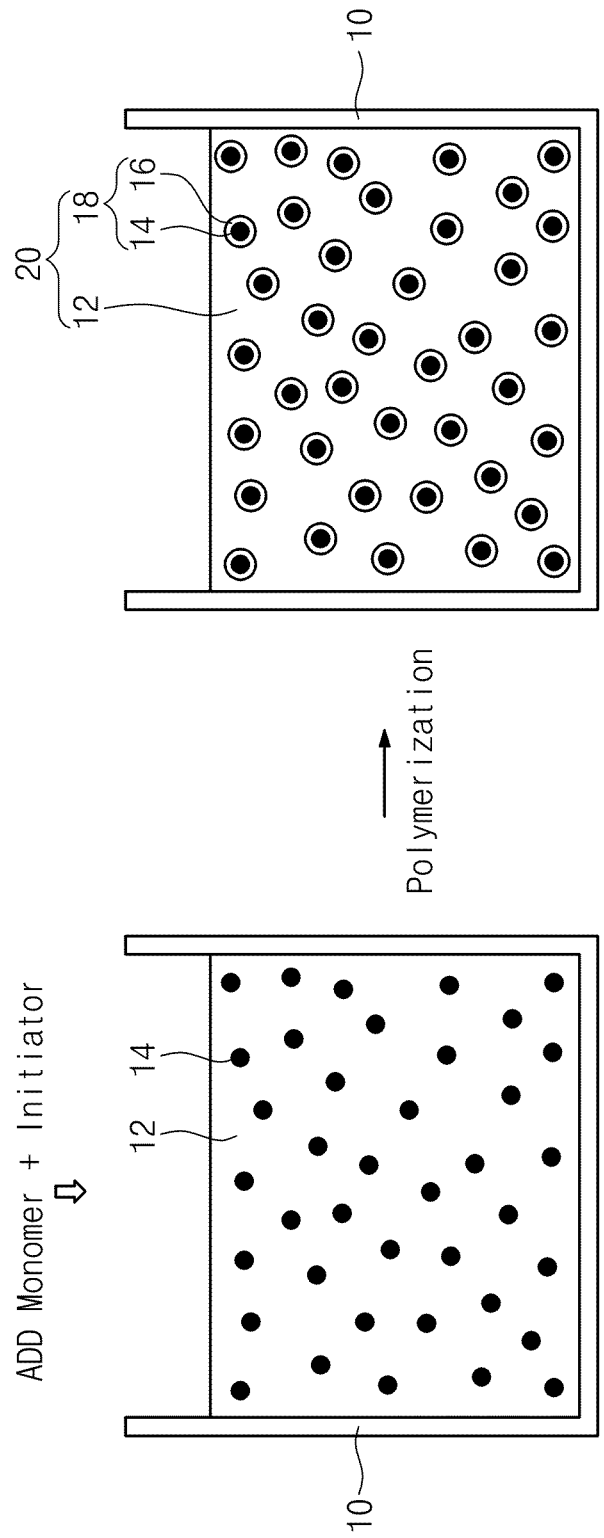
FIG. 1 is a view illustrating a process of fabricating an electrophoretic ink according to an embodiment of the present invention.

FIG. 1 is a view illustrating a process of fabricating an electrophoretic ink according to an embodiment of the present invention.

Referring to FIG. 1, a dielectric fluid 12 is introduced into a container 12, and pigment particles 14 are dispersed in the dielectric fluid 12. Organic/inorganic pigment particles or particles colored with various pigments or dyes may be used as the pigment particles 14. The inorganic pigment particles may include $TiO_2$ nano particles or micron particles, barium sulfate particles, kaolin particles, and zinc oxide particles. Also, carbon black or pigment particles having various colors may be used as light absorption particles. Diarylide yellow, hansa yellow, and benzidin yellow may be used as yellow particles. $PbCrO_4$, cyan blue GT 55-3295, and cibacron black BG pigments may be used in addition to these pigment particles. Low-k dielectric liquids having a dielectric constant of about 2 to about 3 may be mainly used as the dielectric fluid 12. These fluids may include various organic solvents, silicon oils, halogenated organic solvents, and a polymer liquid including a linear or branched saturated hydrocarbon liquid or halogen having a low molecular weight. Hydrocarbons among the low-k dielectric liquids may be usefully used. Examples of the hydrocarbons may include cyclohexyl vinyl ether such as decane epoxide and dodecane epoxide, toluene or naphthalene that is cyclic hydrocarbon, halogenated organic solvents such as tetrafluorodibromothylene, tetrachloroethylene, 1,2,4-trichlorobenzene, and carbon tetrachloride, dodecane, tetradecane, isopar-based solvents, and norpar-based solvents. If dielectric properties and physical properties satisfy configuration conditions of the electrophoretic ink, various solvents except the above-described fluids may be utilized. According to the present invention, the dielectric fluid 12 (dispersion medium) may be prepared by mixing two or more kinds of organic solvents or oils.

A disperser may be used for effectively performing the dispersion process. The disperser may include a ball mill, a disk mill, a media mill, a homogenizer, and an ultrasonic homogenizer. For example, the dispersion process may be performed for about 24 hours to obtain a dispersion phase.

Referring again FIG. 1, at least monomer and initiator are added into the dielectric fluid 12 in which the pigment particles 14 are dispersed. The monomer may include vinyl-based monomers or monomers that are polymerizable by radical polymerization. One kind of monomer may be used, or two or more kinds of monomers mixed with each other may be used. Also, monomers having a functional group may be used to increase a charge quantity of a surface of a final electrophoretic particle. The charge quantity of the surface may be adjusted by adjusting an amount of monomers having the functional group. For example, the monomer may be at least one monomer selected from the group consisting of styrene, ethylene, propylene, ester, acrylate, methyl-methacrylate, acrylic acid, methacrylic acid, and methacrylamide. For example, the initiator may be azobis isobutyronitrile. When the monomer and initiator are added, a polymerization reaction occurs in the container. At this time, the polymerization reaction may be an inverse dispersion polymerization. The polymerization reaction may be performed under an inert gas atmosphere. The pigment particles 14 may be coated with polymeric membranes 16, respectively. The polymeric membranes 16 surrounding the pigment particles 14 may be referred to as electrophoretic particles 18. A crosslinker may be added together with the initiator to improve stability of the polymeric membranes 16. After the polymerization reaction is finished, a temperature of acquired slurries may be lowered to utilize the acquired slurries as the electrophoretic ink. Thus, the electrophoretic ink 20 according to an embodiment of the present invention includes the electrophoretic particles 18 and the dielectric fluid 12.

An amount of materials added before the polymerization reaction is performed is adjusted to leave little non-reacted monomers or reactants. For example, the non-reacted monomers or reactants may be less than about 1% of the total acquired electrophoretic ink. Since the amount of non-reacted monomers or reactants is very small, an operation of the electrophoretic ink is not affected even through the acquired electrophoretic ink is used as it is.

Before the polymerization reaction is performed, at least one of a charge control agent, a stabilizer, and a dispersion stabilizer may be further added into the dielectric fluid 12. The charge control agent may be added to improve electrophoretic properties of the electrophoretic ink including the electrophoretic particles and the dielectric fluid that is a medium for dispersing the electrophoretic particles, thereby to provide en excellent contrast ratio, a low driving voltage, and uniform bistability. The charge control agent may vary surface properties of the particles and improve stability of particle surface charge. Also, since the charge control agent should have serviceability with respect to the dielectric fluid, non-polar non-aqueous disperse systems or additives for engine oil may be used as the charge control agent. Examples of the additives may include hydrocarbons having a relatively long chain length (carbon number 12 to 50), alkyl benzene sulphonic acids, and fatty amine-based salts. The stabilizer may be added so that the electrophoretic particles 18 are not aggregated as well as easily detached after they are attached to a surface of the electrode. Non-aqueous surface active agents may be mainly used as the stabilizer. Examples of the stabilizer may include glycol ethers, acetylenic glycols, alkanolamides, sorbitol-based surface active agents, alkyl amines, tertiary amines, and sulfosuccinates. The dispersion stabilizer may be added to improve dispersion stability. When the particles are coated through general emulsion polymerization, aqueous dispersion polymerization, or suspension polymerization, ionic active agents may be mainly used as the dispersion stabilizer. However, in the present invention, a non-aqueous dispersion stabilizer or non-aqueous surface active agents may be used as the dispersion stabilizer. Since the non-aqueous dispersion stabilizer provides the dispersion stability using a steric hindrance effect due to a high molecular weight, but provides the dispersion stability using electrostatic repulsive forces due to ionization, a relative large amount of the dispersion stabilizer may be required when compared to the general aqueous polymerization.

Since the electrophoretic ink obtained through the method according to an embodiment of the present invention is directly used as an electrophoretic ink without performing succeeding cleaning and fractionation, drying process, and microcapsulation processes, the method of fabricating the electrophoretic ink may be simplified. In addition, since a mixing ratio of the reaction-resultant slurries may be easily changed, the electrophoretic ink having various reflectances may be manufactured using a very simple process. Specifically, since states of the slurries formed during the reaction process are very superior in stability, the slurries may be applicable for easily improving properties of the electrophoretic ink.

FIG. 2 is a sectional view of an electrophoretic display according to an embodiment of the present invention.

Referring to FIG. 2, in an electronic paper 100 according to this embodiment, an electrophoretic ink 20 is disposed between a first substrate 100 and a second substrate 200, which face each other. A common transparent electrode 102 such as indium tin oxide (ITO) is disposed on a surface of the first substrate facing the second substrate 200. A plurality of transparent pixel electrodes 202 may be disposed on a surface of the second substrate 200 facing the first substrate 100. A first transparent protection layer 104 covers the common transparent electrode 102, and a second transparent protection layer 204 covers lower portions of the pixel electrodes 202. The electrophoretic ink 20 is disposed between the protection layers 104 and 204. The transparent protection layers 104 and 204 may be formed of materials having low or absent reactivity and insulating property. For example, the protection layers 104 and 204 may be silicon oxide layers. The electrophoretic particles 18 contained in the electrophoretic ink 20 may have a negative charge. When positive (+) and negative (−) voltages are selectively applied to the pixel electrodes 202, the electrophoretic particles 18 having the negative charge are pulled toward the pixel electrodes 202 to which the positive (+) voltage is applied and are away from the pixel electrodes 202 to which the negative (−) voltage is applied. Thus, movement of the electrophoretic particles 18 may be adjusted to realize a specific image.

Experimental Example 1

Figure 3A:
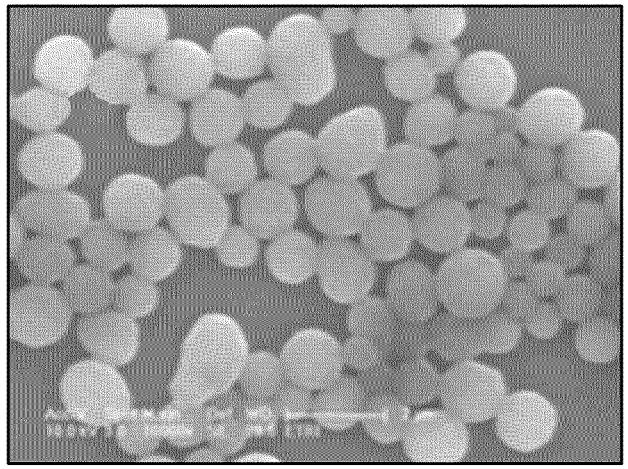
FIG. 3A is a photograph of pigment particles used in Experimental Example 1 of the present invention.

Organic black particles were prepared as pigment particles. The particles are organic black particles manufactured by Sekisui Chemical Co., Ltd (JP) and have spherical shapes with an average particle size of about less than 1 μm. FIG. 3A shows an electron micrograph of the particles. As shown in FIG. 3A, it was seen that the particles has the spherical shapes with smooth surfaces. 5 g of the organic black pigment particles were chosen and dispersed into a dielectric fluid. 150 g of isopar-G manufactured by Exxon Chemical Co., Ltd were used as the dielectric fluid. 3 g of non-polar isobutyl rubber-based solsperse 17000 that is a kind of dispersion stabilizers were added into the dielectric fluid. Also, 150 g of halocarbon 0.8 were added into the dielectric fluid. Then, the pigment particles were dispersed for 24 hours using an ultrasonic homogenizer. At this time, a constant temperature apparatus was used to maintain a dispersion solution at room temperature.

Figure 3B:
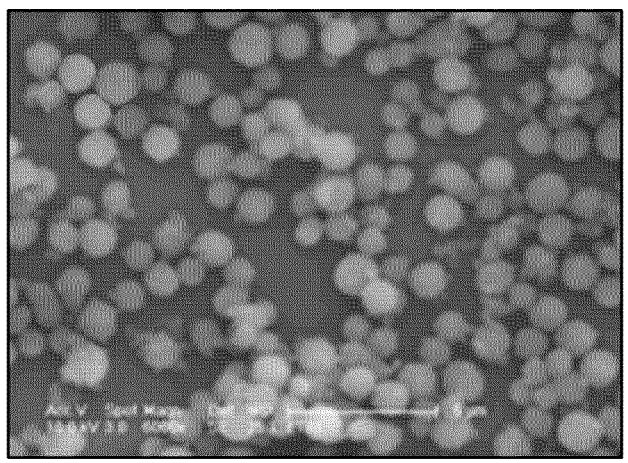
FIG. 3B is a photograph of electrophoretic particles formed in Experimental Example 1 of the present invention.

After 24 elapsed hours, the dispersed black particles dispersion solution was injected into a 500 ml three-neck reactor, and the reactor is placed under hydrogen atmosphere. After a reaction system is installed as described above, to form polymeric membranes surrounding the pigment particles, a monomer mixture composed of 3 g of methylmethacrylate used as a monomer, 0.188 g of methacrylic acid having a carboxyl group that is a kind of functional groups, and 0.562 g of methacrylamide having an amine group that is a different functional group was injected into the reactor. 0.112 g of ethylene glycol dimethylacrylate was injected into the reactor as a crosslinker. 0.0938 g of azobis isobutyronitrile (AIBN) that is a radical initiator were thrown into the reactor to perform a coating polymerization reaction process after the reactor increases at about 65° C. The coating polymerization reaction process was maintained for 24 hours, and then, the temperature within the reactor was lowered at room temperature, thereby finishing the coating polymerization reaction process. To confirm whether the particles are coated after the coating reaction process is performed, the results observed using a scanning electron microscopy were illustrated in FIG. 3B. As shown in FIG. 3B, it was seen that the surfaces of the particles are very roughened when compared to those of the particles shown in FIG. 3A. Thus, it may confirm that surface states of the pigment particles are changed, and therefore, it may analogize that the polymeric membranes are formed.

Experimental Example 2

Organic black pigment particles and a dielectric fluid were prepared and dispersed similarly with Experimental Example 1. Also, a reaction system was installed similarly with Experimental Example 1, and a dispersion solution was injected into the reactor. Methylmethacrylate (hereinafter, referred to as a "MMA") and methacrylamide (hereinafter, referred to as a "MAA") were added into the reactor. Amounts of the added MMA and MAA were changed as listed in Table 1 to perform a coating polymerization reaction process.

TABLE 1

|  | Case 1 | Case 2 | Case 3 | Case 4 | Case 5 | Case 6 |
|---|---|---|---|---|---|---|
| Mol % of MMA | 100 | 96 | 94.5 | 93 | 91.5 | 90 |
| Mol % of MAA | 0 | 4 | 5.5 | 7 | 8.5 | 10 |

Figure 4:
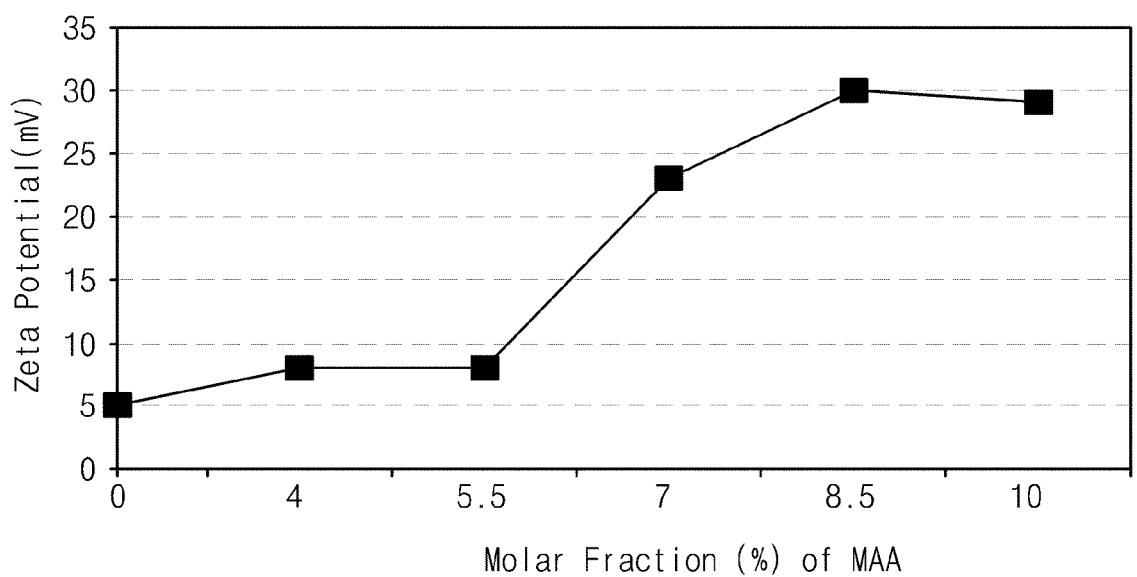
FIG. 4 is a graph illustrating results of Experimental Example 2 of the present invention.

A charge quantity of a surface of a particle formed in each of cases was measured. The charge quantity was measured as zeta potential. The zeta potential increases as the charge quantity of the surface increases. Also, the zeta potential has a positive or negative value according to the polarity of the charge. The slurries obtained by polymerization reaction were cleaned using isopar-G to remove the remaining monomer and non-reaction materials. Solsperse 17000 that is a dispersion stabilizer was thrown into the obtained slurries in which the remaining monomer and the non-reaction materials are removed to prepare a particle dispersion solution. Thereafter, the zeta potential was measured to illustrate the measured zeta potential in a graph of FIG. 4. As shown in FIG. 4, as a molar fraction of the MAA having a positive (+) amine group increases, the zeta potential increased to a positive value. That is, it may confirm that the charges contained in the functional group are expressed in proportional to an increasing amount of a monomer when an amount the monomer having the functional group according to compositions of polymeric membranes corresponding to shells surrounding the pigment particles that are cores increases. Also, the zeta potential is maintained in a saturated state when a molar fraction of the MAA is over about 8.5%. This is done due to a reaction ratio difference between the MMA and the MAA.

As shown in the experimental examples, it may be seen that the electrophoretic particles can be effectively formed according to the fabrication method of the present invention.

Experimental Example 3

Figure 5A:
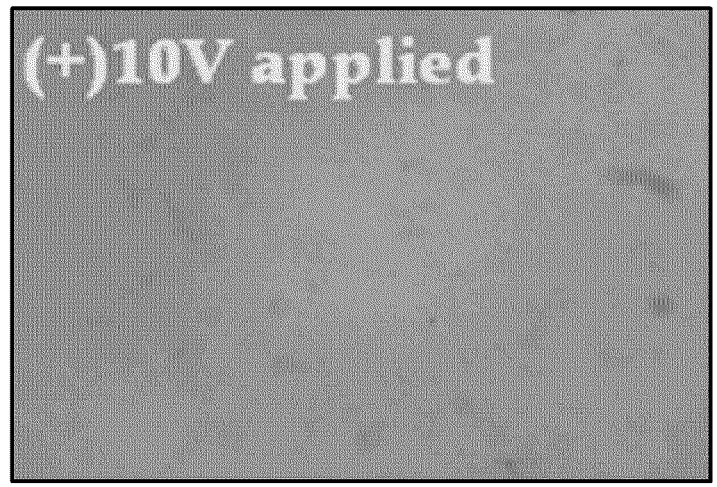
FIGS. 5A and 5B are photographs illustrating results of Experimental Example 3 of the present invention.
Figure 5B:
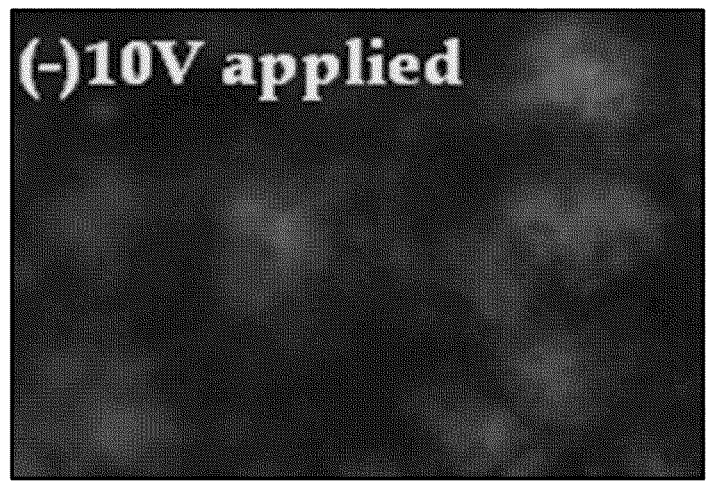

Black pigment particles and whit pigment particles were dispersed into the same dielectric fluid as that of Experimental Example 1, and a coating polymerization reaction process was performed using the same method as that of Experimental Example 1. An acquisition generated after the polymerization reaction process is performed was provided to an electrophoretic ink 20 of an electrophoretic display 300 of FIG. 2. FIGS. 5A and 5B respectively show photographs when (+) 10 V is applied to all of pixel electrodes 204 or common transparent electrodes 102 and when (−) 10 V is applied to all of the pixel electrodes 204 or common transparent electrodes 102. Referring to FIGS. 5A and 5B, it may confirm that a high contrast ratio of about greater than 10:1 is achieved. Therefore, it may confirm that the electrophoretic ink having superior optical properties can be easily fabricated according to the fabrication method of the present invention.

In the method of fabricating the electrophoretic ink according to an embodiment of the present invention, the pigment particles surrounded by the polymeric membranes and the dielectric fluid in which the pigment particles are dispersed can be utilized as the electrophoretic ink as they are.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of fabricating an electrophoretic ink, the method comprising:
   dispersing pigment particles into a dielectric fluid;
   adding at least one monomer and an initiator into the dielectric fluid; and
   forming polymeric membranes surrounding the pigment particles in the dielectric fluid.

2. The method of claim 1, wherein the polymeric membranes surrounding the pigment particles are formed by polymerizing or copolymerizing the at least one monomer.

3. The method of claim 1, wherein the pigment particles comprise at least one material selected from the group consisting of $TiO_2$, barium sulfate, kaolin, zinc oxide, diarylide yellow, hansa yellow, benzidin yellow, $PbCrO_4$, cyan blue GT 55-3295, and cibacron black BG.

4. The method of claim 1, wherein the dielectric fluid comprises at least one material selected from the group consisting of cyclohexyl vinyl ether, decane epoxide, dodecane epoxide, toluene, naphthalene, tetrafluorodibromothylene, tetrachloroethylene, 1,2,4-trichlorobenzene, carbon tetrachloride, dodecane, tetradecane, isopar-based solvents, and norpar-based solvents.

5. The method of claim 1, wherein the at least one monomer is selected from the group consisting of styrene, ethylene, propylene, ester, acrylate, methylmethacrylate, acrylic acid, methacrylic acid, and methacrylamide.

6. The method of claim 1, wherein the initiator comprises azobis isobutyronitrile (AIBN).

7. The method of claim 1, further comprising adding at least one of a charge control agent and a stabilizer into the dielectric fluid.

8. An electrophoretic ink, comprising:
   a dielectric fluid; and
   electrophoretic particles dispersed in the dielectric fluid and comprised of pigment particles and polymeric membranes surrounding the pigment particles, the polymeric membranes being formed in the dielectric fluid and comprising polymerized or copolymerized products of at least one monomer and an initiator.

9. The electrophoretic ink of claim 8, wherein the pigment particles comprise at least one material selected from the group consisting of $TiO_2$, barium sulfate, kaolin, zinc oxide, diarylide yellow, hansa yellow, benzidin yellow, $PbCrO_4$, cyan blue GT 55-3295, and cibacron black BG.

10. The electrophoretic ink of claim 8, wherein the dielectric fluid comprises at least one material selected from the group consisting of cyclohexyl vinyl ether, decane epoxide, dodecane epoxide, toluene, naphthalene, tetrafluorodibromothylene, tetrachloroethylene, 1,2,4-trichlorobenzene, carbon tetrachloride, dodecane, tetradecane, isopar-based solvents, and norpar-based solvents.

11. The electrophoretic ink of claim 8, wherein the polymeric membrane comprises a polymer or copolymer of at least one material selected from the group consisting of styrene, ethylene, propylene, ester, acrylate, methylmethacrylate, acrylic acid, methacrylic acid, and methacrylamide.

12. An electrophoretic display, comprising:
   a first substrate;
   a second substrate facing the first substrate;
   a common transparent electrode disposed on a surface of the first substrate that faces the second substrate;
   a plurality of pixel electrodes arranged on a surface of the second substrate that faces the first substrate, the plurality of pixel electrode being separated from each other; and
   an electrophoretic ink disposed between the common transparent electrode and the pixel electrodes,
   wherein the electrophoretic ink comprises a dielectric fluid and electrophoretic particles dispersed in the dielectric fluid and comprised of pigment particles and polymeric membranes surrounding the pigment particles, the polymeric membranes being formed in the dielectric fluid and comprising polymerized or copolymerized products of at least one monomer and an initiator.

13. The electrophoretic display of claim 12, wherein the pigment particles comprise at least one material selected from the group consisting of $TiO_2$, barium sulfate, kaolin, zinc oxide, diarylide yellow, hansa yellow, benzidin yellow, $PbCrO_4$, cyan blue GT 55-3295, and cibacron black BG.

14. The electrophoretic display of claim 12, wherein the dielectric fluid comprises at least one material selected from the group consisting of cyclohexyl vinyl ether, decane epoxide, dodecane epoxide, toluene, naphthalene, tetrafluorodibromothylene, tetrachloroethylene, 1,2,4-trichlorobenzene, carbon tetrachloride, dodecane, tetradecane, isopar-based solvents, and norpar-based solvents.

15. The electrophoretic display of claim 12, wherein the polymeric membrane comprises a polymer or copolymer of at least one material selected from the group consisting of styrene, ethylene, propylene, ester, acrylate, methylmethacrylate, acrylic acid, methacrylic acid, and methacrylamide.

* * * * *